United States Patent [19]
Bradley

[11] 3,875,337
[45] Apr. 1, 1975

[54] METHOD FOR MONITORING A CLASSROOM

[76] Inventor: Earl K. Bradley, 760 Van Kirk St., Clairton, Pa. 15025

[22] Filed: Mar. 15, 1974

[21] Appl. No.: 451,515

[52] U.S. Cl. .................. 179/1 VC, 35/8, 73/558
[51] Int. Cl. ............................................. G01v 1/00
[58] Field of Search.... 179/1 VC, 1 VL, 1 P, 1 MN, 179/100.2 B, 1 N; 181/125; 35/9 B, 8; 340/169; 73/555, 556, 557, 558, 560

[56] References Cited
UNITED STATES PATENTS

| | | | |
|---|---|---|---|
| 1,864,527 | 6/1932 | Castner | 73/558 |
| 3,031,528 | 4/1962 | Bolston | 73/558 |
| 3,304,368 | 2/1967 | Ford et al. | 179/1 P |
| 3,545,564 | 12/1970 | Barber | 73/558 |

Primary Examiner—Kathleen H. Claffy
Assistant Examiner—Tommy P. Chin
Attorney, Agent, or Firm—Brown, Murray, Flick & Peckham

[57] ABSTRACT

Audible sounds produced by student members of a classroom are monitored for instructional purposes by a method that includes arranging the student members of a class into a plurality of spatially-located groups. Separate electrical signals are generated proportional to the level of audible sound produced by each of the groups. These signals are then separately amplified and biased to provide a predetermined sensitivity signal level. The bias signals are used to control the flow of current in separate electrical circuits that are interconnected in a manner to control separate light indicators, a buzzer and a radio receiver or other form of sound-producing apparatus.

9 Claims, 3 Drawing Figures

METHOD FOR MONITORING A CLASSROOM

BACKGROUND OF THE INVENTION

The present invention relates to a method for monitoring a classroom to allow students to control their own behavior on the basis of noise level produced by a spatial arrangement of student groups made up of the members of a classroom.

More particularly in accordance with the present invention, the method involves triggering an electrical circuit to operate an indicating device when the sound level produced by one of the student groups exceeds a predetermined level which can be variably selected with regard to each of the groups.

My invention involves a monitoring method for use in the learning process of a classroom wherein sociability grouping is a classroom design in which students are organized into two or more teams.

The sociability grouping model employs two teams in which students sit face-to-face. Team members are encourged to develop a strong feeling of togetherness. This feeling causes members to work to earn esteem and social approval from others in the group. This emphasis on togetherness and sociability give the design its name.

Students begin by electing two leaders who then choose two teams. The leaders take time organizing the teams because teams must be as equal as possible in ability and maturity so that contests are not one-sided. Leaders also make "trades" that usually make it possible for students to be on the team of their choice.

The teams operate continuously throughout the year. Every student is always a member of one or the other of the two teams. Each team elects leaders. These leaders reach a consensus with the teacher concerning classroom rules, goals and procedures. Then the leader establishes a consensus within the team so that each member receives group approval for following them.

Each team also elects an academic advisor or coach to help team members with their learning tasks. The coach works with every team member to improve the team's chances of winning a contest against the other team.

Group reinforcement consequences are greatly increased by these contests. When a team member produces information that wins points for the team, there is immediate reinforcement from team members. The sum total of smiles, nods of approval, and clapping from the whole group is much greater than the reinforcement total that is possible from the teacher alone. Contests are frequent and highly competitive, but the competition stresses team cooperation. Competition is balanced by cooperation; cooperation between members of the same team, and cooperation between members of opposing teams. For example, the leaders who run the contests, must cooperate with each other or there is no contest. Competition and excitement make cooperation necessary and meaningful.

The method of the present invention includes the steps of arranging student members of a class into a plurality of spatially-located groups, generating a separate electrical signal proportional to the level of audible sound produced essentially by each of the groups of students, separately amplifying each of the electrical signals, biasing the separately-amplified electrical signals to produce a predetermined sensitivity signal level, using the biased signals separately to control the flow of current in an electrical circuit including indicator means for each of the biased signals, and inhibiting the operation of one of the indicator means when another indicating means is activated by the separately-amplified electrical signals.

The method of the present invention further includes the steps of providing an outside source of audible sound such as a radio receiver to contribute to the level of audible sound produced in total by student members of the class. This outside source of sound is controlled to terminate upon activation of one of the indicating means. The method of the present invention further includes providing that the aforementioned indicating means take the form of separate light indicators for each of the separate biased electrical signals and second indicating means, such as a buzzer, which is activated by any one of the separately-biased signals.

These features and advantages of the present invention as well as others will be more fully understood from the following description when read in light of the accompanying drawings, in which.

Figure 1:
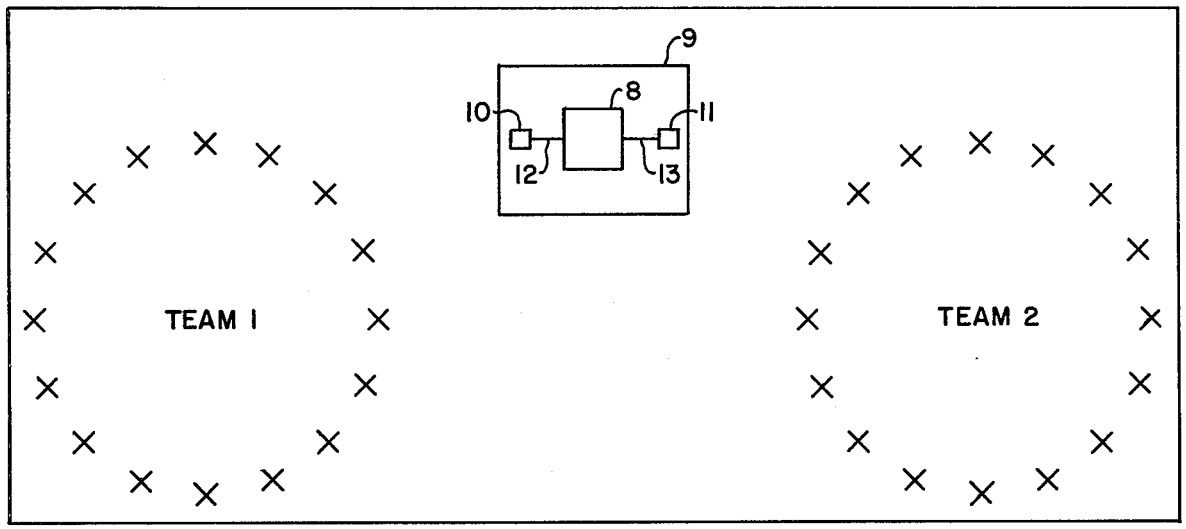
FIG. 1 is a schematic arrangement of a monitor in a classroom.

In FIG. 1, there is illustrated one typical classroom arrangement to carry out the monitoring method of the present invention. In the classroom, a monitoring device is supported upon a table 9 located between groups of students. Two directional type microphones 10 and 11 are arranged at opposite sides of the device 8. These microphones are directed toward spatial locations where the microphones are responsive to the audible sounds generated by the separate groups of students making up the members of a classroom. As indicated in FIG. 1, a first group of students has been denoted as Team 1 and a second group of students has been denoted as Team 2. The microphones 10 and 11 separately produce electrical signals in lines 12 and 13, respectively. These signals are proportional to the level of audible sound generated essentially only by the respective groups.

Figure 2:
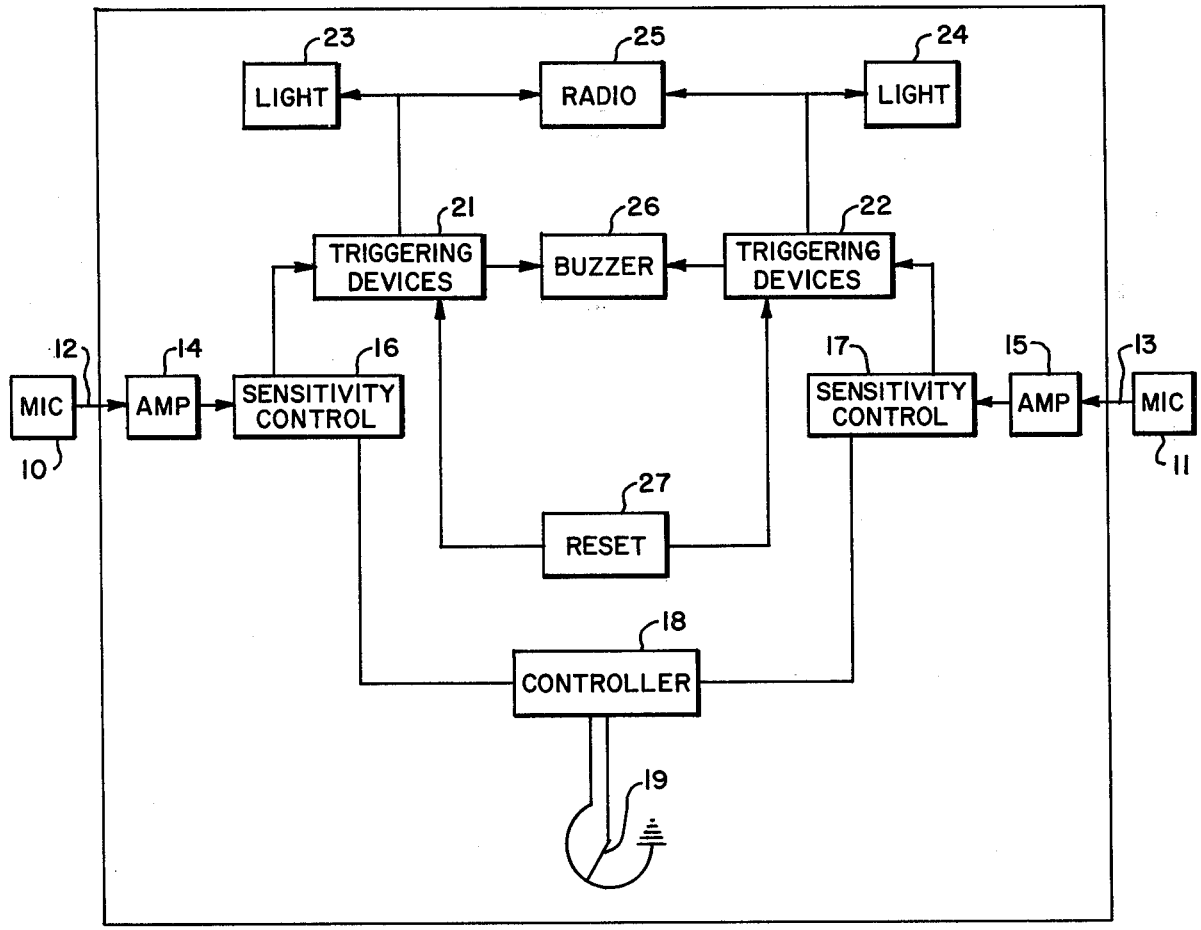
FIG. 2 is a 2 block diagram of apparatus to carry out the monitoring method according to the present invention.

As illustrated by FIG. 2, the electrical signals in lines 12 and 13 are delivered to amplifiers 14 and 15, respectively, forming part of the monitoring device 8. The amplified audio signals are delivered to separate sensitivity controls 16 and 17 connected for individual control by a controller 18 having an overriding main control provided by a manually adjustable potentiometer with a movable slide wire 19. The output signals from the sensitivity controls 16 and 17 are adjusted by the controller 18 both in relation to a desired signal level and one with respect to the other to compensate for response characteristics of the microphones and amplifying circuitry. When one of the output signals from the sensitivity controls exceeds a predetermined signal level, it actuates a separate triggering device 21 or 22. When one of these triggering devices has been actuated by the signal received, then a light indicator 23 or 24, separately associated with the triggering device, is turned ON. An outside source of audible sound such as a radio receiver 25 is controlled by both of the triggering devices 21 and 22 so that the radio is turned OFF when either of the devices 21 or 22 is actuated. A buzzer 26 is also caused to operate when one of the triggering devices 21 or 22 is actuated. The triggering devices 21 and 22 are used in electrical circuitry in such a manner that when one of them is actuated the other is inhibited from operation. A reset control 27 is connected to the triggering devices to reset the electrical circuit when one of them has been energized.

Figure 3:
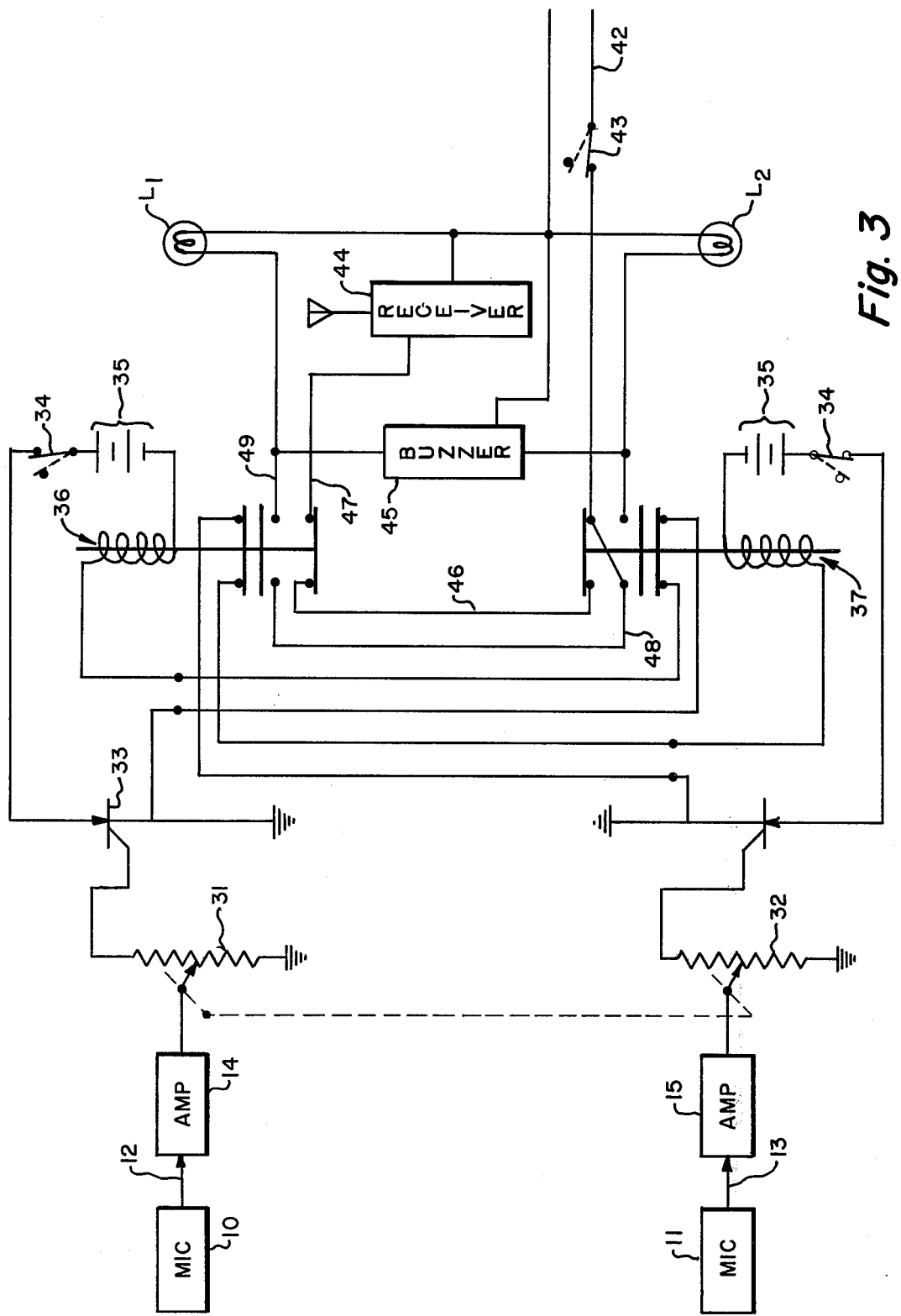
FIG. 3 is an electrical diagram of one form of monitoring apparatus according to FIG. 2.

FIG. 3 illustrates in greater detail one particular arrangement of the electrical circuitry of a monitor to carry out the method of the present invention. The microphones 10 and 11, previously described, have their outputs connected to amplifiers 14 and 15, respectively. The output signals from these amplifiers are biased by separate potentiometers 31 and 32, each having a movable slide wire that is mechanically interconnected to move the slide wires in unison or individually. The separately-biased electrical signals which are proportional to the level of audible sounds detected by the microphone for each of the groups of students are applied to separate electrical control circuits. These circuits each include an SCR 33 with the base terminal thereof receiving one of the output signals from the potentiometers. The emitter terminal of the SCR is connected through a reset switch 34 to a battery 35. The positive potential of the battery for the electrical circuit associated with microphone 10 is applied to a solenoid coil 36 having its other side maintained at a negative potential through normally-closed contacts of a solenoid coil 37 for the electrical circuit associated with microphone 11. The negative potential side of the solenoid coil 36 is connected to a collector lead of the SCR which is maintained at ground potential. The solenoid coil 37 is connected to the positive potential of battery 35 whereby the coil is energized by maintaining a ground potential at one side through closed contacts of solenoid coil 36.

Thus, in regard to FIG. 3, it will be readily seen that the electrical circuit associated with microphone 10 includes contact points maintained in the normally-conductive position by the solenoid coil 37 in the circuit for microphone 10. In a similar manner, the electrical circuit associated with microphone 11 has the contact points maintained conductive by the solenoid coil 36 in the electrical circuit associated with microphone 10.

A line current at 120 VAC, for example, is delivered by lines 41 and 42, the latter having a switch 43. Line 41 is connected to one filament terminal of a lamp L1 and a lamp L2. Line 41 is also connected to the outside source of audible sound such as a radio receiver 44. In place of a radio receiver, a tape recorder or the like may be used. Line 41 is also connected to a buzzer 45 or other form of alarm sounding device. One of two contact points maintained at a normally-closed position by the solenoid coil 37 is connected to the line 42 and the other of these contact points has line 43 which is connected to one of two contact points maintained at the normally-closed position by the solenoid-operated device 36. The other of the latter two contact points is connected by line 47 to the receiver 44. When either of the solenoid coils 36 or 37 is energized, the receiver 44 will be deenergized. The current potential of line 42 is also applied to another contact point of an additional pair maintained normally open by the solenoid coil 37. When solenoid coil 37 is energized, the contact points that are normally open are thereby closed and deliver an energizing current to the buzzer 45 and light L2.

The current in line 42 is passed by line 48 to the first of two contacts maintained in a normally-open position by solenoid coil 36. The other of these two contacts receives current from line 48 when solenoid coil 36 is energized. Current is then passed by a line 49 to buzzer 45 and the light L2.

When solenoid coil 37 is energized, light L2 receives an illuminating current and the buzzer receives an energizing current. In a similar manner, when the solenoid coil 36 is energized, the light L1 receives an illuminating current and the buzzer 45 receives an energizing current. It can thus be observed that once an SCR fires in one of the control circuits, the relay contacts assume the actuated position which is opposite from that shown in FIG. 3. This opens the circuit, energizes the buzzer 45, turns the receiver 44 OFF, and energizes one of the lamps L1 or L2. In doing this, the SCR in the electrical circuit that has not been actuated cannot energize the solenoid therein even if the SCR fires because the circuit is open. The SCR is then reset using switch 34.

The method of monitoring sound levels of a classroom through the use of the monitor described herein allows students to control the level of audible sound produced by the groups and thereby their own behavior by adjusting the sensitivity controls and resetting the control circuit. An instructor has a greater degree of freedom for assisting individual students with their work. This method of monitoring a classroom lifts the burden of maintaining discipline from the instructor.

It will be understood by those skilled in the art that the electrical circuit illustrated in FIG. 3 and described herein is but one example of apparatus that is useful to carry out the method of the invention.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A method to monitor the relative level of at least two sources of audible sounds produced by student members of a class, said method including the steps of:
   arranging the student members of a class into a plurality of spatially-located groups,
   generating a separate electrical signal proportional to the level of audible sounds produced by each of said groups of students,
   separately amplifying each of said electrical signals,
   biasing the separately-amplified electrical signals to provide a predetermined sensitivity signal level,
   using the bias signals separately to control the flow of current in an electrical circuit including indicator means for each of said bias signals, and
   inhibiting the operation of one of said indicator means when another of said indicator means is activated.

2. The method according to claim 1 including the further step of providing an outside source of audible sound to contribute to the level of audible sound produced by the aggregate of such student members of a class.

3. The method according to claim 2 including the further step of controlling said outside source of audible sound to terminate upon activation of one of said indicating means.

4. The method according to claim 1 including the further step of resetting said electrical circuit to deactivate an indicator means after activation thereof.

5. The method according to claim 1 wherein each of said bias signals is separately used to actuate two indicators.

6. The method according to claim 5 wherein said two indicators include a sound indicator and a light indicator.

7. The method according to claim 3 wherein said outside source of audible sound is a receiver for radiowave transmissions.

8. The method of claim 1 wherein said separate electrical signals are generated by directional microphones.

9. The method of claim 1 wherein the electrical circuit receiving each of said bias signals includes an SCR controlled by a separately-amplified biased electrical signal, the solenoid coil and contact points for said indicating means, said contact points further inhibiting the energization of the solenoid coil in a different one of said electrical circuits.

* * * * *